(12) United States Patent
Troedel et al.

(10) Patent No.: US 6,504,488 B2
(45) Date of Patent: Jan. 7, 2003

(54) ELECTRONIC DEVICE

(75) Inventors: Bernhard Troedel, Limburg (DE); Wolfgang Reichel, Münzenberg (DE); Michael Römer, Staufenberg (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 09/844,241

(22) Filed: Apr. 27, 2001

(65) Prior Publication Data

US 2002/0003471 A1 Jan. 10, 2002

(30) Foreign Application Priority Data

Apr. 29, 2000 (DE) .......................................... 100 21 127

(51) Int. Cl.$^7$ ................................................. G08B 5/36
(52) U.S. Cl. .............................. 340/815.49; 340/815.5; 340/815.57; 340/870.01
(58) Field of Search ................................ 340/555, 556, 340/557, 545.3, 572.4, 572.8, 5.41, 815.49, 815.47, 815.5, 815.58, 815.59, 815.74, 870.01, 870.02, 870.29; 235/379, 380, 381; 705/41

(56) References Cited

U.S. PATENT DOCUMENTS 4,454,414 A  *  6/1984  Benton ..................... 340/5.41
5,139,021 A  *  8/1992  Sekii et al. .................. 600/300
5,666,544 A  *  9/1997  Matsumoto et al. ... 395/800.01
5,781,321 A     7/1998  Kobayashi .................. 359/143

FOREIGN PATENT DOCUMENTS

| DE | 41 18 486 | 12/1992 | ............. G06F/1/16 |
| DE | 44 10 741 | 9/1994 | ........... H05K/11/02 |
| DE | 195 23 901 | 1/1997 | ............ H04B/1/08 |
| EP | 0 837 385 | 10/1997 | ............. G06F/1/16 |
| EP | 0 899 889 | 8/1998 | ............ H04B/1/08 |
| EP | 0 961 423 | 5/1999 | ........... H04B/10/10 |

* cited by examiner

Primary Examiner—Van Trieu
(74) Attorney, Agent, or Firm—Cohen, Pontani, Lieberman & Pavane

(57) ABSTRACT

In an electronic device having a housing containing electronic components and a front part connected to the housing and having control elements, the connections between the electronic components and the control elements are made using a first transmitter and a second receiver on the front part respectively aligned with a second receiver and a second transmitter on the housing. This arrangement obviates the need for mechanical connections which are susceptible to faults between the housing and the front part.

3 Claims, 1 Drawing Sheet

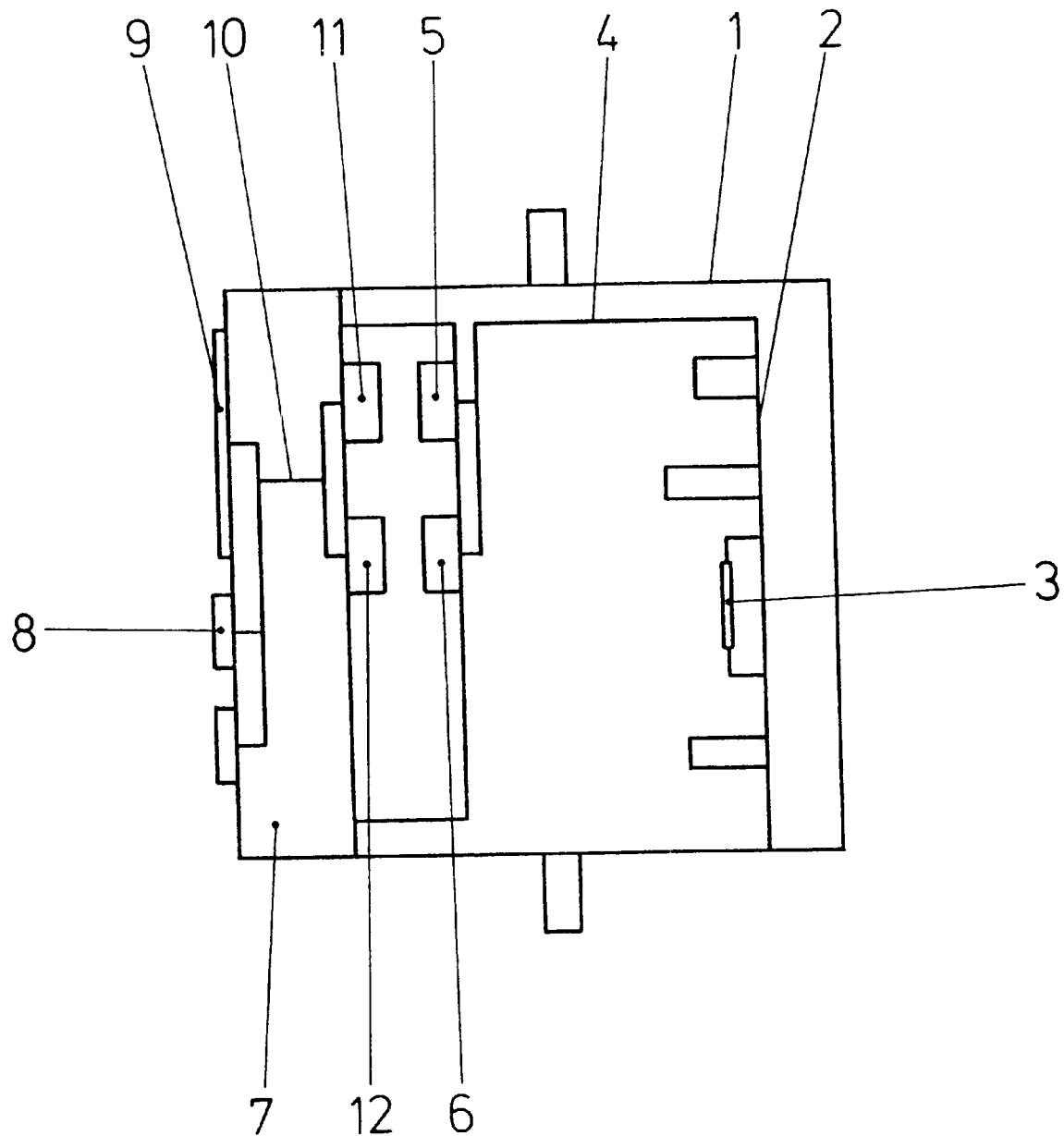

ELECTRONIC DEVICE

BACKGROUND OF THE INVENTION

1. Field of the Invention

The present invention relates to an electronic device having a housing which contains electronic components and a front part connectable to the housing having control elements and/or a display that is connected to the electronic components in the housing.

2. Description of the Related Art

Electronic devices having a housing in which electronic components are mounted and a front part with control elements and/or a display that is connected to the electronic components are designed for very diverse purposes. For example, such devices may be a combined instrument for a motor vehicle, a vehicle navigation device or a radio. In such devices, the front part is usually produced separately from the housing and is then connected to the housing. In this case, the front part is often seated in a holder on an instrument panel, i.e., such as the instrument panel of a motor vehicle, and the housing is mounted behind the instrument panel on a support. The required electrical connections are then produced by a multiplicity of mechanical plug connections. This type of connection is relatively expensive, may lead to contact problems and Electromagnetic compatibility (EMC) problems, and requires relatively narrow tolerances. With broader tolerances, a component is often also provided with a plug holder into which a plug attached to a flexible cable of the other component can be inserted manually. Although this type of connection compensates for alignment errors between the housing and the front part, production of the electrical connection requires an additional work step, which may be skipped or forgotten. Furthermore, this solution includes the same problems associated with plug connections.

SUMMARY OF THE INVENTION

The object of the present invention is to design an electronic device having a housing with electronic components and a front part with control elements and/or a display such that the front part may be connected to the housing with particularly broad dimensional differences without contact problems.

The object of the present invention is met by arranging a transmitter and a receiver on the front part and arranging a further receiver and a further transmitter on the housing.

The use of transmitters and receivers obviates the need for mechanical connections between the front part and the electronic components in the housing. Since the transmitters and receivers may be arranged directly opposite one another, they require only very low power. Accordingly, the components used therein may be components which are available at low cost. In addition, even relatively broad dimensional differences, in particular a lateral offset, do not result in faults in the connection, since wireless connections generally do not require any alignment accuracy. For use in motor vehicles, it is particularly beneficial that the device according to the present invention is insensitive to vibration due to the lack of mechanical contacts.

The present invention may be implemented using transmitters of any design. Furthermore, it is also possible to connect the electronic components in the housing with the elements of the front part inductively. In a particularly inexpensive embodiment, the electronic appliance the transmitters each have a transmission diode and the receivers each have a reception diode. These types of transmitters and receivers are typically used, for example, in remote controls for television sets or video machines and are therefore manufactured in bulk, thereby ensuring availability at low cost. Since they operate using light, they do not cause electromagnetic faults and are also unaffected by electromagnetic waves.

In a further embodiment, the front part is a component which can be detached from the housing manually, without a tool, for the purposes of antitheft protection. If the device according to the present invention is a car radio, for example, this provides the option for the front part to be removed from the housing and taken along when the vehicle is left, so that the car radio is protected against theft.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The FIGURE is a schematic diagram of an electronic device according to an embodiment of the present invention.

DETAILED DESCRIPTION OF THE PRESENTLY PREFERRED EMBODIMENTS

The FIGURE shows a housing 1 in which electronic components 3 are arranged on a printed circuit board 2. These components 3 are connected by conductors 4 to a transmitter 5, in the form of a transmission diode, and a receiver 6, in the form of a reception diode, on the front of the housing 1.

Mounted on the front of the housing 1 is a front part 7 which, by way of example, is in the form of a control unit and has control elements 8 and a display 9. These control elements 8 and the display 9 are connected to a receiver 11 and to a transmitter 12 by conductors 10. The receiver 11 is a reception diode arranged in exact alignment with the transmitter 5. Correspondingly, the transmitter 12 is in exact alignment with the receiver 6 and is in the form of a transmission diode.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An electronic device, comprising:

a housing containing electronic components;

a front part having opposing front and rear sides, said front part connectable in an installed position relative to the housing and having an element including at least one of a control element and a display connected to said electronic components in said housing via a connection, said at least one of a control element and a display connected on said front side of said front part, wherein said rear side faces said housing in said installed position of said front part and said front side faces away from said housing in said installed position of said front part;

a first transmitter and a first receiver arranged on said rear side of said front part and a second receiver and a second transmitter arranged on said housing, wherein said first transmitter and said first receiver are respectively arranged for corresponding to said second receiver and said second transmitter for effecting said connection between said element and said electronic components when said front part is connected to said housing.

2. The electronic device of claim 1, wherein each of said first and second transmitters comprises a transmission diode and each of said first and second receivers comprises a reception diode.

3. The electronic device of claim 1, wherein said front part is selectively manually detachable from said installed position for providing antitheft protection.

* * * * *